United States Patent
Thomas et al.

(10) Patent No.: US 9,495,065 B2
(45) Date of Patent: Nov. 15, 2016

(54) CURSOR ASSIST MODE

(71) Applicant: Navico Holding AS, Egersund (NO)

(72) Inventors: Steve Thomas, Tulsa, OK (US); Paul Butterworth, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 622 days.

(21) Appl. No.: 13/731,139

(22) Filed: Dec. 31, 2012

(65) Prior Publication Data

US 2014/0013284 A1 Jan. 9, 2014

Related U.S. Application Data (60) Provisional application No. 61/708,527, filed on Oct. 1, 2012, provisional application No. 61/668,966, filed on Jul. 6, 2012.

(51) Int. Cl.
| | |
|---|---|
| *G06F 3/048* | (2013.01) |
| *G06F 3/0481* | (2013.01) |
| *G06F 3/0488* | (2013.01) |
| *G01C 21/20* | (2006.01) |

(52) U.S. Cl.
CPC ........... *G06F 3/04812* (2013.01); *G01C 21/20* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 4,829,493 A | 5/1989 | Bailey | |
| 4,879,697 A | 11/1989 | Lowrance et al. | |
| 5,025,423 A | 6/1991 | Earp | |
| 5,191,341 A | 3/1993 | Gouard et al. | |
| 5,537,380 A | 7/1996 | Sprankle et al. | |
| 5,825,352 A | 10/1998 | Bisset et al. | |
| 5,995,102 A * | 11/1999 | Rosen ................. | G06F 3/04812 715/234 |
| 6,054,984 A * | 4/2000 | Alexander ............ | G01R 13/20 345/440 |
| 6,225,984 B1 | 5/2001 | Crawford | |
| 6,321,158 B1 | 11/2001 | DeLorme et al. | |
| 6,411,283 B1 * | 6/2002 | Murphy ................. | G06F 3/041 178/18.01 |
| 6,418,080 B2 | 7/2002 | Inouchi | |
| 6,421,299 B1 | 7/2002 | Betts et al. | |

(Continued)

OTHER PUBLICATIONS

PCT International Search Report and Written Opinion; PCT/IB2013/060285; Feb. 18, 2014.

(Continued)

*Primary Examiner* — Hua Lu
(74) *Attorney, Agent, or Firm* — Nelson Mullins Riley & Scarborough LLP (57) ABSTRACT

Described herein are implementations of various technologies for a method and apparatus for providing marine electronic data. In one implementation, a screen may display marine electronic data. A cursor may be provided that is movable by placement of a finger over the cursor. A request to display the cursor at a position such that the cursor is not obstructed from view by the finger may be received. The requested cursor may be displayed at the position on the screen.

20 Claims, 7 Drawing Sheets

(56) References Cited

U.S. PATENT DOCUMENTS

| | | |
|---|---|---|
| 6,761,692 B2 | 7/2004 | Angelsen et al. |
| 6,816,782 B1 | 11/2004 | Walters et al. |
| 7,002,579 B2 | 2/2006 | Olson |
| 7,236,426 B2 | 6/2007 | Turner et al. |
| 7,430,461 B1 | 9/2008 | Michaels |
| 7,469,381 B2 | 12/2008 | Ording |
| 7,475,057 B1 | 1/2009 | Obradovich |
| 7,479,949 B2 | 1/2009 | Jobs et al. |
| 7,652,952 B2 | 1/2010 | Betts et al. |
| 7,683,771 B1 | 3/2010 | Loeb |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,812,826 B2 | 10/2010 | Ording et al. |
| 7,812,827 B2 | 10/2010 | Hotelling et al. |
| 7,812,828 B2 | 10/2010 | Westerman et al. |
| 7,844,915 B2 | 11/2010 | Platzer et al. |
| 7,864,163 B2 | 1/2011 | Ording et al. |
| 7,870,496 B1 | 1/2011 | Sherwani |
| 7,890,867 B1 | 2/2011 | Margulis |
| 8,019,532 B2 * | 9/2011 | Sheha .................... G01C 21/20 340/995.1 |
| 8,063,540 B2 | 11/2011 | Angelsen et al. |
| 8,300,499 B2 | 10/2012 | Coleman et al. |
| 8,305,840 B2 | 11/2012 | Maguire |
| 8,514,658 B2 | 8/2013 | Maguire |
| 8,605,550 B2 | 12/2013 | Maguire |
| 2002/0035574 A1 | 3/2002 | Dumas |
| 2002/0093541 A1 | 7/2002 | Schileru-Key |
| 2003/0218637 A1 | 11/2003 | Sloo et al. |
| 2004/0193364 A1 | 9/2004 | Chojnacki |
| 2004/0240590 A1 * | 12/2004 | Cameron ........... H03M 13/1102 375/340 |
| 2005/0102101 A1 * | 5/2005 | Beesley ................. G01C 21/30 701/533 |
| 2006/0013066 A1 | 1/2006 | Nishimori et al. |
| 2006/0119585 A1 | 6/2006 | Skinner |
| 2006/0136478 A1 | 6/2006 | Berkner |
| 2006/0224940 A1 | 10/2006 | Lee |
| 2006/0238406 A1 * | 10/2006 | Nohara ................... G01S 7/003 342/90 |
| 2007/0226656 A1 * | 9/2007 | Zwart .................... G06F 3/0481 715/856 |
| 2008/0104051 A1 | 5/2008 | Gosper |
| 2008/0126935 A1 | 5/2008 | Blomgren |
| 2008/0183905 A1 | 7/2008 | Kitada |
| 2008/0204424 A1 | 8/2008 | Jin et al. |
| 2009/0002326 A1 * | 1/2009 | Pihlaja ................ G06F 3/04812 345/173 |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0262086 A1 * | 10/2009 | Chen .................... G06F 3/0488 345/173 |
| 2009/0287409 A1 * | 11/2009 | Summers ................ B63B 49/00 701/533 |
| 2010/0020037 A1 * | 1/2010 | Narita ..................... G06F 3/042 345/173 |
| 2010/0080082 A1 * | 4/2010 | Betts ........................ G01S 7/521 367/88 |
| 2010/0127847 A1 | 5/2010 | Evans et al. |
| 2010/0127975 A1 * | 5/2010 | Jensen ................ G06F 3/03547 345/157 |
| 2010/0145601 A1 * | 6/2010 | Kurtti ................ G01C 21/3476 701/532 |
| 2010/0199225 A1 | 8/2010 | Coleman et al. |
| 2010/0226203 A1 | 9/2010 | Buttle et al. |
| 2010/0250122 A1 * | 9/2010 | Kubota ................. G01C 21/203 701/408 |
| 2011/0013484 A1 * | 1/2011 | Coleman .................. G01S 15/87 367/88 |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0054785 A1 * | 3/2011 | Wood ..................... G01C 21/00 701/533 |
| 2011/0153186 A1 | 6/2011 | Jakobson |
| 2011/0154183 A1 | 6/2011 | Burns et al. |
| 2011/0258580 A1 | 10/2011 | Syrjarinne et al. |
| 2011/0265021 A1 * | 10/2011 | Chien .................. G06F 3/04883 715/769 |
| 2011/0267265 A1 * | 11/2011 | Stinson ................ G06F 3/0304 345/157 |
| 2012/0001773 A1 * | 1/2012 | Lyons .................. G01C 23/005 340/970 |
| 2012/0011437 A1 | 1/2012 | James et al. |
| 2012/0014220 A1 * | 1/2012 | DePasqua ........... G01S 7/52004 367/88 |
| 2012/0069712 A1 | 3/2012 | Potanin et al. |
| 2012/0106300 A1 | 5/2012 | Maguire |
| 2012/0117507 A1 | 5/2012 | Tseng et al. |
| 2012/0185801 A1 | 7/2012 | Madonna et al. |
| 2012/0207309 A1 | 8/2012 | Eppolito |
| 2013/0007665 A1 | 1/2013 | Chaudhri et al. |
| 2013/0019175 A1 | 1/2013 | Kotler et al. |
| 2013/0271301 A1 | 10/2013 | Kabel et al. |
| 2014/0009481 A1 | 1/2014 | Butterworth |
| 2014/0013259 A1 | 1/2014 | Thomas et al. |
| 2014/0013260 A1 | 1/2014 | Thomas et al. |
| 2014/0013276 A1 | 1/2014 | Butterworth |
| 2014/0096060 A1 | 4/2014 | Thomas et al. |
| 2014/0250401 A1 * | 9/2014 | Matsumoto ........... G06F 3/0488 715/771 |
| 2014/0313130 A1 * | 10/2014 | Yamano ................ G06F 3/0488 345/157 |

OTHER PUBLICATIONS

PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
NVIDIA Control Panel Setting for Gaming (screenshots); https://www.youtube.com/watch?v=Hkgwmh3oYVo; Jul. 3, 2012 (accessed Jan. 25, 2015).
Microsoft Outlook 2010 (screenshots); 2010.

* cited by examiner

CURSOR ASSIST MODE

CROSS-REFERENCE TO RELATED APPLICATIONS

This application claims the benefit of U.S. Provisional Patent Application Ser. No. 61/668,966; filed Jul. 6, 2012; titled CURSOR ASSIST MODE; and the disclosure of which is incorporated herein by reference.

This application claims benefit of U.S. Provisional Patent Application Ser. No. 61/708,527; filed Oct. 1, 2012; titled CURSOR ASSIST MODE; and the disclosure of which is incorporated by reference.

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Accurate data, including, for example, navigation, mapping, and the location of stationary and moving objects, can be very useful for marine activities. The operator of a marine vessel monitors marine traffic. A device that is easy to operate and that provides data in an easy to follow format can provide advantages to the vessel operator. Such advantages may include requiring less time to request and review information, which in turn provides the vessel operator with more time to monitor the marine traffic.

SUMMARY

Described herein are implementations of various technologies for a method and apparatus for providing marine electronic information. In one implementation, a screen may display marine electronic data. A cursor may be provided that is movable by placement of a finger over the cursor. A request to display the cursor at a position such that the cursor is not obstructed from view by the finger may be received. The requested cursor may be displayed at the position on the screen.

Described herein are also implementations of various technologies for a non-transitory computer-readable medium having stored thereon computer-executable instructions which, when executed by a computer causes the computer to perform various actions. In one implementation, the actions may include providing marine electronic data for display on a screen. A cursor that is movable by placement of a finger over the cursor may be provided at a first position. A user request to display the cursor at a second position on the screen may be received. The second position can be at a predetermined offset from the first position. The cursor may then be displayed at the second position.

Described herein are also implementations of various technologies for an apparatus for displaying marine electronic data. The apparatus includes one or more processors, a screen, and memory. The memory has a plurality of executable instructions. When the executable instructions are executed by the one or more processors, the one or more processors may provide marine electronic data for display on the screen. A cursor at a first position may be provided. The cursor can be movable by placement of a finger over the cursor. A user request to display the cursor at a second position may be received. The second position can be at a predetermined offset from the first position. The cursor may be displayed at the second position.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It shall be understood that "user request" or "user can request" shall also include, but are not limited to, double tapping the screen (tapping the screen twice in rapid succession), pressing a particular physical or virtual button, making a selection from a menu, placement of a cursor at a particular location, an audible command, contact and a selection with a stylus, selection with a mouse, as well as the explicit description of the "user request" for the particular operation or how the "user can request", explicitly, the particular operations.

Furthermore, in the interests of clarity "the cursor at the position such that the cursor is not obstructed from view by the finger" and "cursor at the second position" shall be referred to in this description as "offset cursor."

The following paragraphs provide a brief summary of various technologies and techniques directed to providing marine electronic information in accordance with one or more implementations described herein.

In one implementation, various technologies and techniques described herein are directed to a display device having a screen. The screen displays marine electronic data. The user can operate the display device in one of several modes, including a panning mode and a cursor assist mode. In the panning mode, the user can move the marine electronic data in a particular direction. In the cursor assist mode, the screen displays a cursor. The cursor is movable by placing the finger onto the screen and moving the finger. That is, the cursor moves as the finger moves. However, when the cursor moves under the finger, the finger obstructs the cursor from view. As such, in one implementation, by receiving a user request the display device provides an offset cursor. The finger can now move the offset cursor at an offset from the finger such that the finger does not obstruct the user's view of the cursor.

One or more implementations of various techniques for providing marine electronic information will now be described in more detail with reference to FIGS. 1-9 in the following paragraphs.

MODES OF OPERATION

Figure 1:
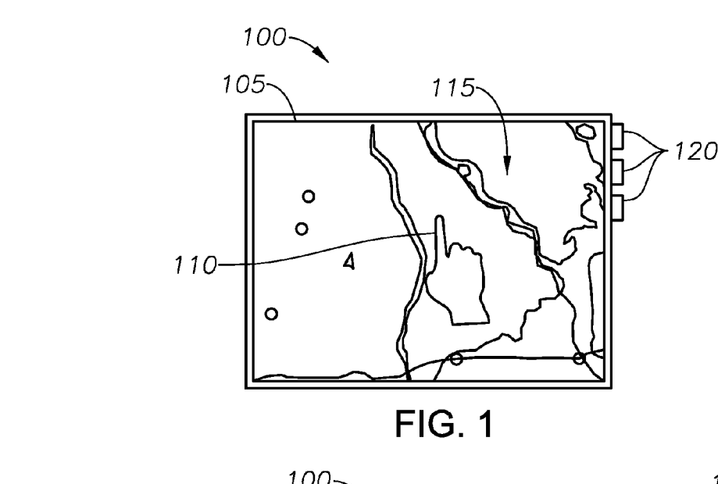
FIG. 1 illustrates a schematic diagram of a display device in accordance with various techniques described herein.

FIG. 1 illustrates schematic diagram of a display device 100 in accordance with various implementations described herein. The display device 100 includes a screen 105. In certain implementations, the screen 105 can be sensitive to touching by a finger 110. In other implementations, the screen 105 can be sensitive to the body heat from the finger 110. In some implementations, the screen 105 may be sensitive to a stylus, mouse, or motion capture. The screen 105 is configured to display marine electronic data 115. The marine electronic data 115 may include marine electronic data, such as chart data, radar data, sonar data and the like. The display device 100 can also include a plurality of buttons 120. The plurality of buttons 120 can include either physical buttons or virtual buttons, or a combination thereof.

Panning Mode

Figure 2:
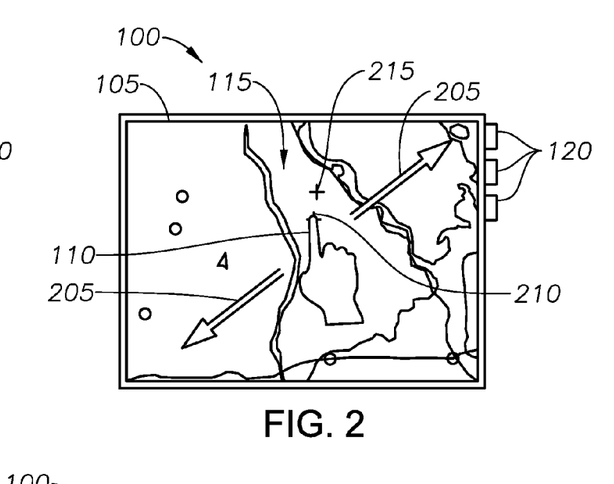
FIG. 2 illustrates a schematic diagram of the display device in panning mode in accordance with various techniques described herein.

FIG. 2 illustrates a schematic diagram of the display device 100 in panning mode in accordance with various implementations described herein. The display device 100 can move the marine electronic data 115, responsive to receiving a user request. The user request to move the marine electronic data 115 in a particular direction 205 can include placing the finger 110 onto the screen and sliding the finger 110 in the particular direction 205. When the display device 100 receives the user request to move the data, the display device 100 moves the data in the particular direction 205. This is known as the panning mode.

The display device 100 can also provide a cursor 210. The display device 100 may provide the cursor 210 by default. Alternatively, the display device 100 can provide the cursor 210 in response to a user request.

Cursor Assist Mode

The display device 100 moves the cursor 210 when the user places the finger 110 over the cursor 210 and moves the finger 110. In this manner, the cursor 210 is configured to move with the finger 110. Placement of the finger 110 over the cursor 210, however, may obstruct the user's view of the cursor 210. Accordingly, in one implementation, the user can request the display device 100 to display an offset cursor 215 on the screen 105 that is offset from the cursor 210/finger 110. The cursor 210 is located under the tip of the finger 110. As such, the position of the cursor 210 can be approximated to be under a certain area of the tip of the finger 110, such as the center. Therefore, an offset from the cursor 215 may correspond to an offset from the finger 110. After the offset cursor 215 appears, the display device 100 may remove the cursor 210. The user can request the offset cursor 215 by stationary placement of the finger 110 over the cursor 210 for a predetermined amount of time. For example, the predetermined time can be about three seconds. This mode may be referred to as the cursor assist mode.

When the display device 100 receives the user request for an offset cursor 215, the display device 100 provides the offset cursor 215 at a predetermined distance from finger 110. The predetermined distance is configured such that the finger 110 does not obstruct the view of the offset cursor 215. For example, the predetermined distance can be between about ¼" (0.635 cm) to about ½" (1.27 cm). In certain implementations, the predetermined distance may be adjustable to the user's preferences. Although the offset cursor 215 is shown above the cursor 210 and the finger 110, the offset cursor 215 can be positioned elsewhere, e.g., the upper right, the upper left, the lower left, and the lower right. (See FIG. 3). In one implementation, the offset cursor 215 resembles the cursor 210, while in another implementation, the offset cursor 215 can appear different from the cursor 210. Further, in yet another implementation, the display device 100 can freeze the electronic marine data 115, thereby preventing panning when the offset cursor 215 is present.

Figure 3:
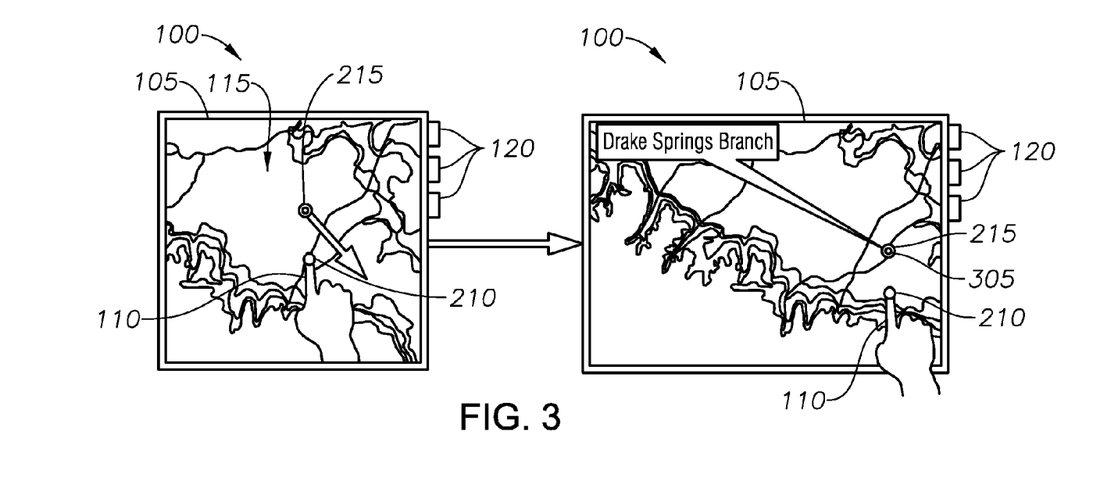
FIG. 3 illustrates a schematic diagram of the display device in cursor assist mode in accordance with various techniques described herein.

FIG. 3 illustrates a schematic diagram of the display device 100 in cursor assist mode. Once the display device 100 displays the offset cursor 215, the user can then move the offset cursor 215 by moving their finger 110. The offset cursor 215 moves with the finger 110 at the predetermined distance from the finger 110. The user can request selection of a particular point 305 using the offset cursor 215. In one implementation, the user selection can include placement of the offset cursor 215 over the particular point 305 followed by pressing one of the plurality of buttons 120.

Transitioning from Panning Mode to Cursor Assist Mode

Figure 4:
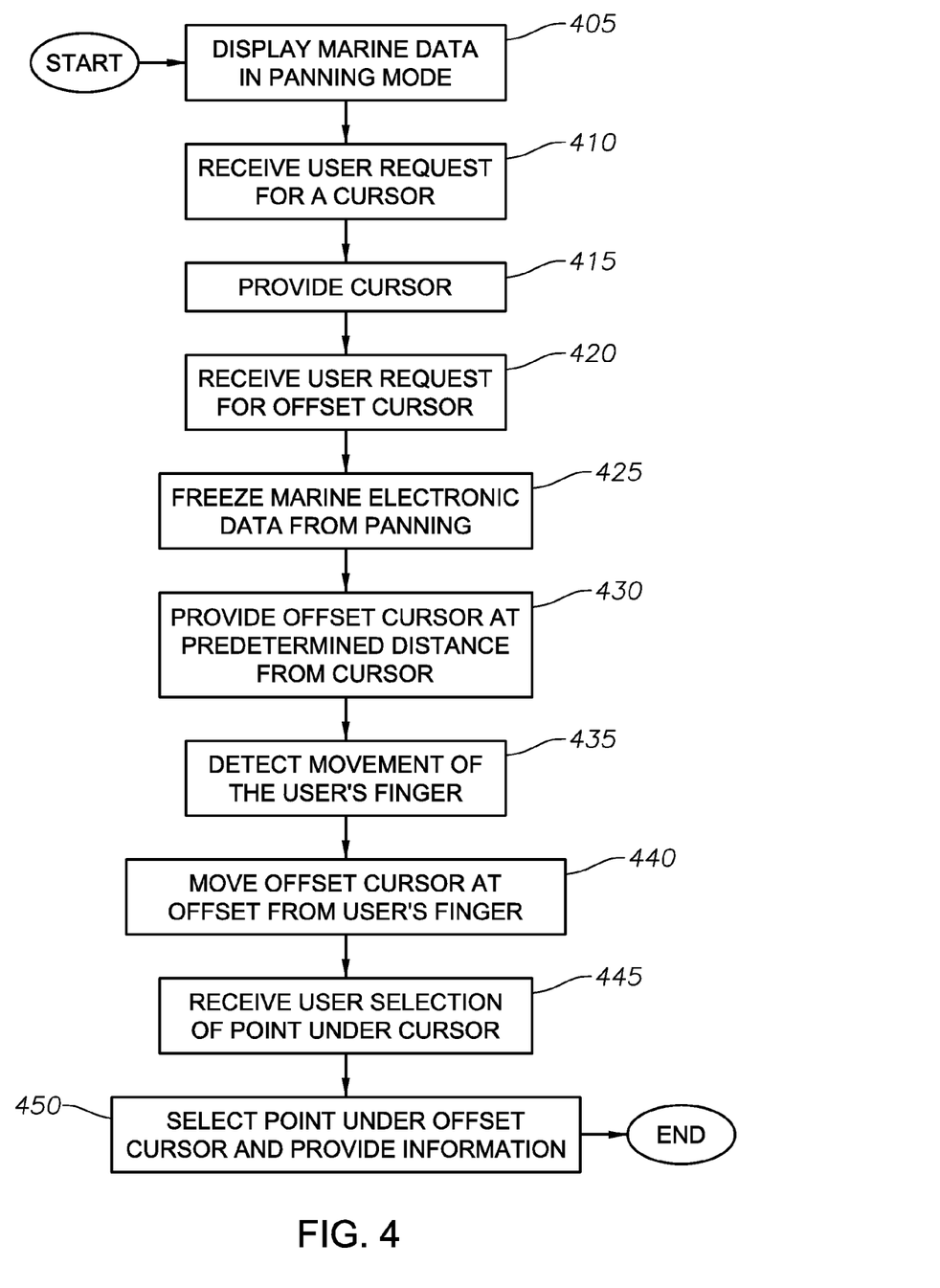
FIG. 4 illustrates a flow diagram describing a process for changing from panning mode to cursor assist mode in accordance with various techniques described herein.

FIG. 4 illustrates a flow diagram describing a process for changing from the panning mode to the cursor assist mode. The process for changing from panning mode to the cursor assist mode is described with references to FIGS. 1-3. At block 405, the display device 100 displays marine electronic data 115 in the panning mode.

At block 410, the display device 100 receives a user request for a cursor 210. When the display device 100 receives the request for the cursor 210, the display device 100 provides the cursor 210 at block 415. At this point, the display device 100 can detect placement of the finger 110 and the cursor 210 and can move the marine electronic data in the direction 205 of the finger 110 movement. At block 420, the display device 100 receives a user request for the display device 100 to display the offset cursor 215. At block 425, after receiving the request for the offset cursor 215, the display device 100 freezes the marine electronic data 115 from panning, provides the offset cursor 215 at the predetermined distance from the finger 110, and removes the cursor 210 (block 430).

At block 435, the display device 100 detects movement of the user's finger 110 and moves (block 440) the offset cursor 215 with the finger 110 at the predetermined distance from the finger 110. At block 445, the display device 100 receives a user request for a selection of an area under which the offset cursor 215 is placed. At block 450, the display device 100 the selects the area under the offset cursor 215.

Information Displays

Figure 5:
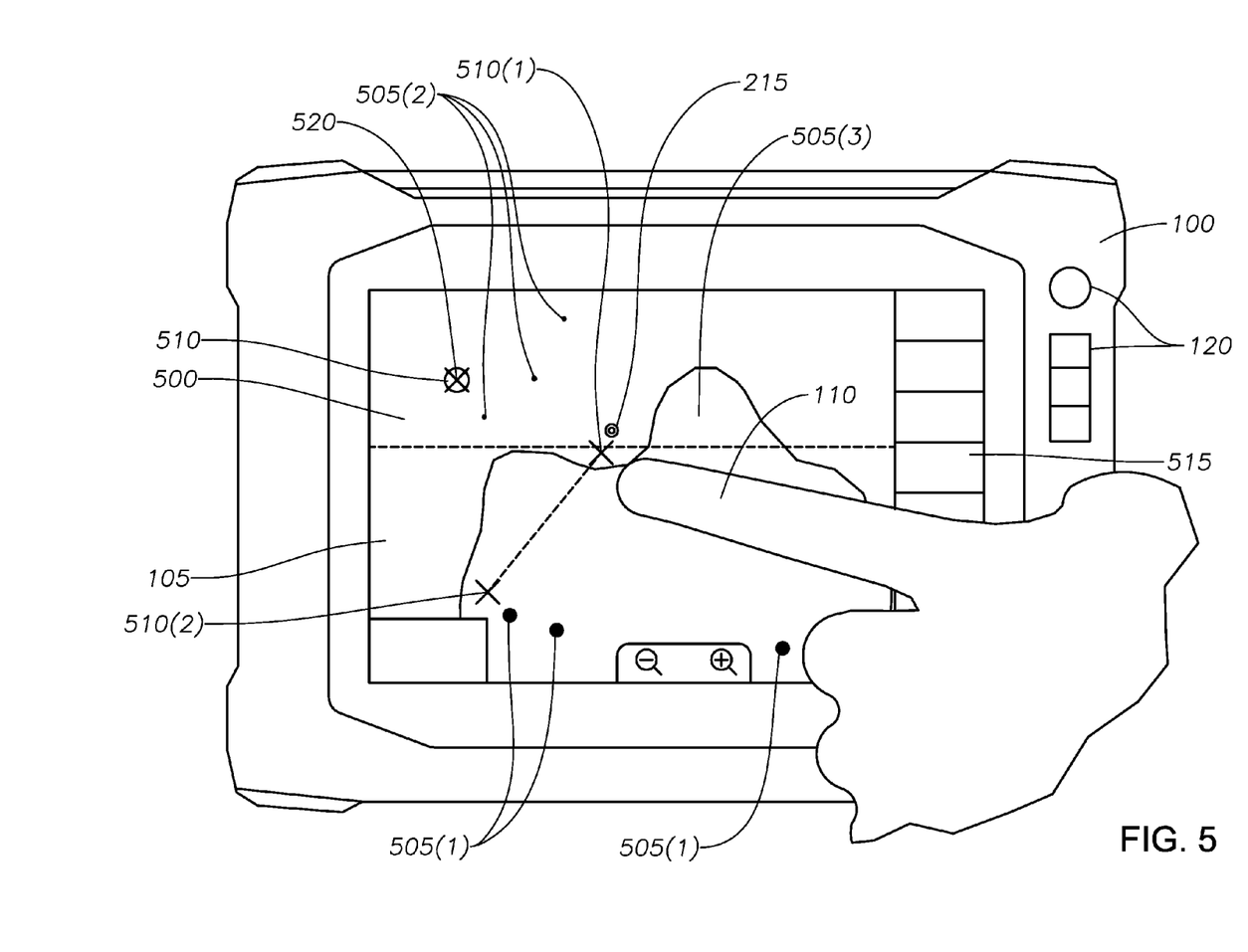
FIG. 5 is a schematic of a graphical user interface displaying chart data in accordance with various techniques described herein.
Figure 6:
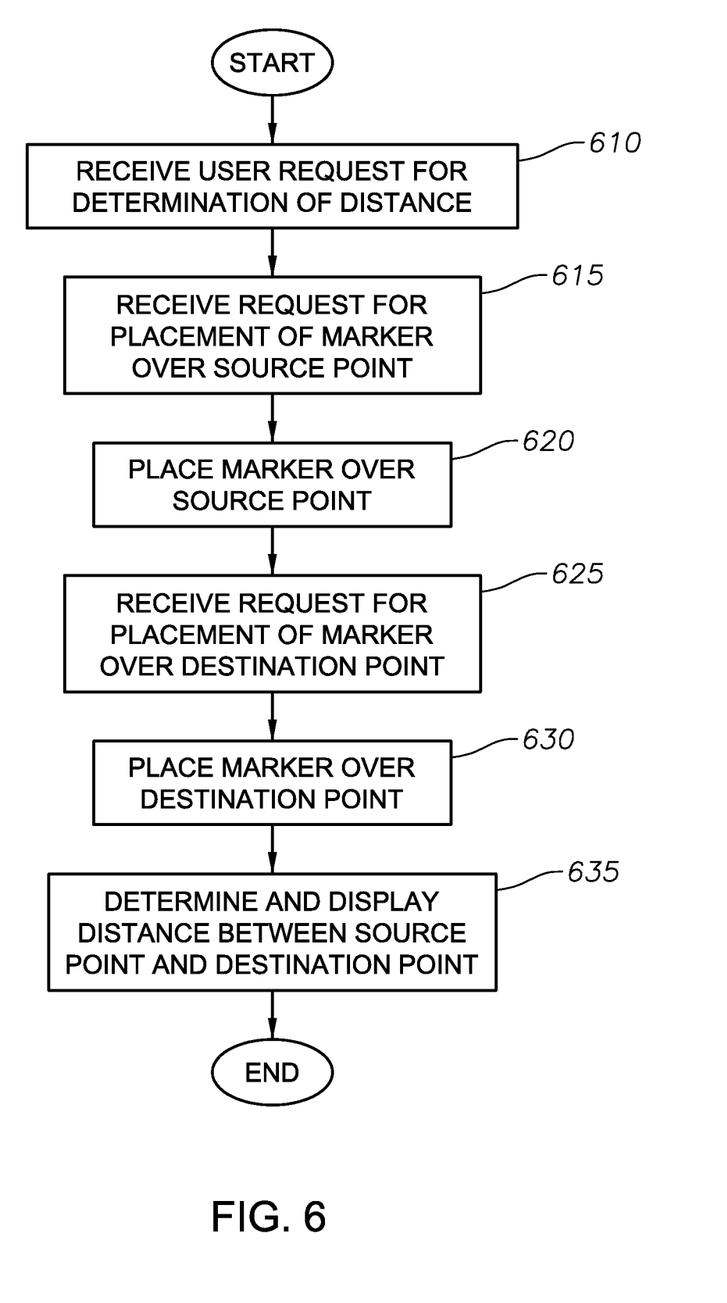
FIG. 6 is a flow diagram describing a process for determining the distance between two points in accordance with various techniques described herein.
Figure 7:
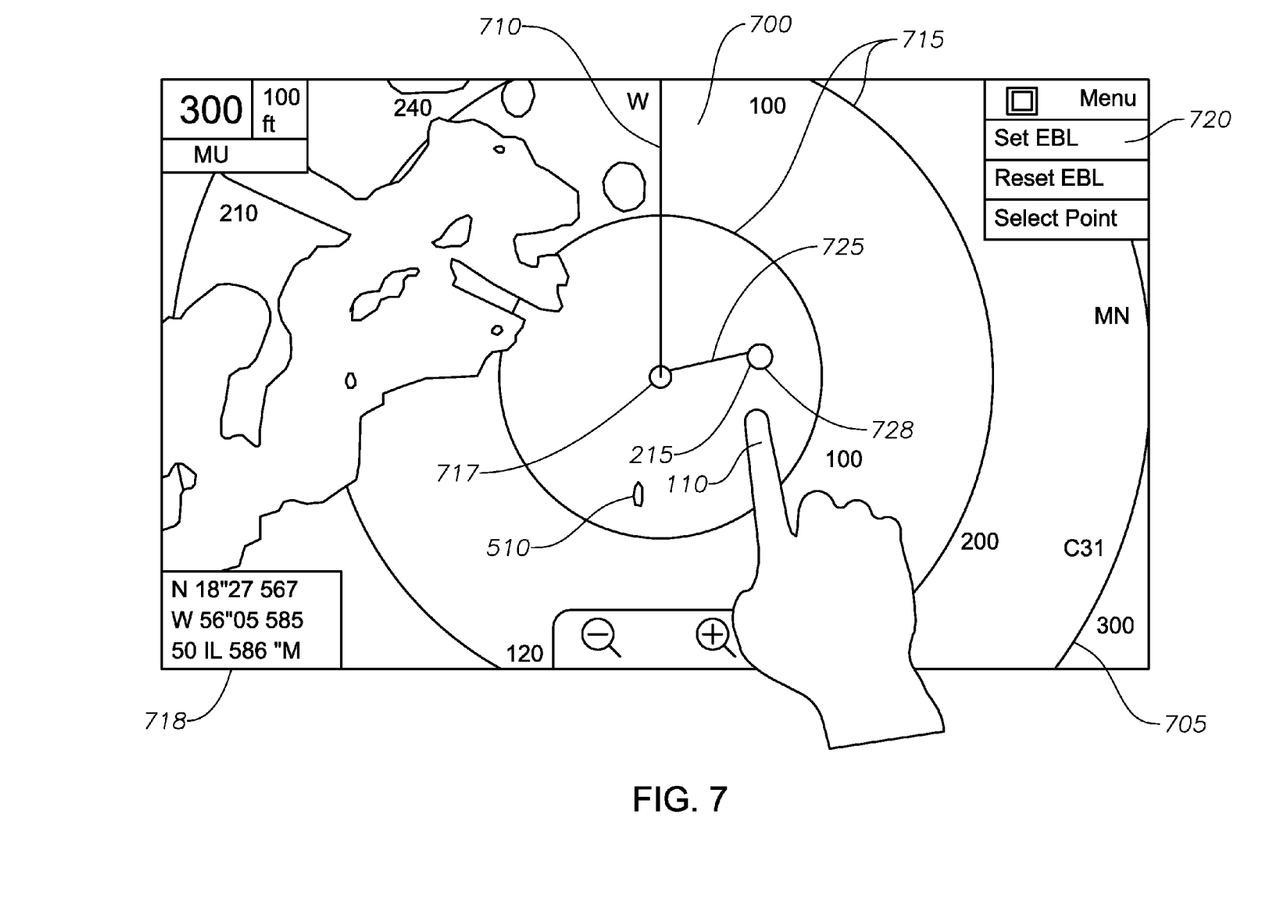
FIG. 7 is a schematic of a graphical user interface displaying radar data in accordance with various techniques described herein.
Figure 8:
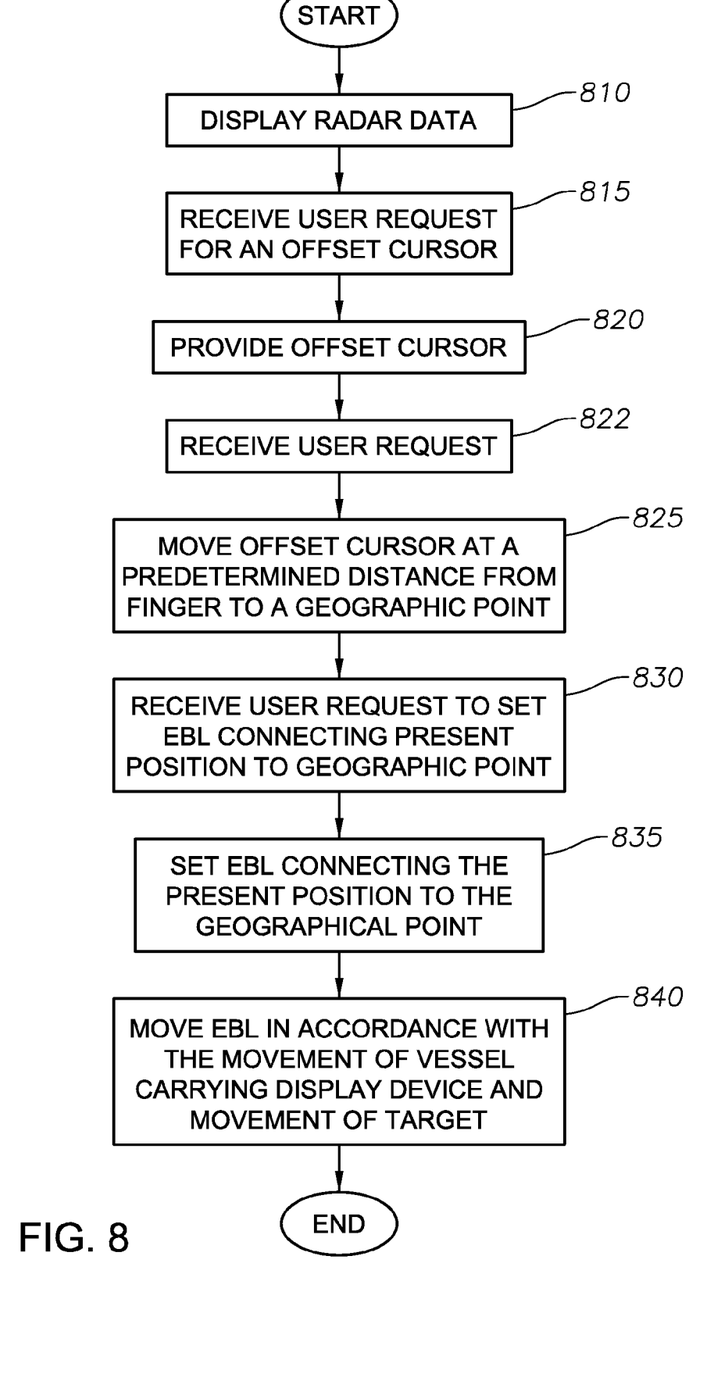
FIG. 8 is a flow diagram describing a process for setting an electronic bearing line in accordance with various techniques described herein.

As noted above, the marine electronic data can include chart data, radar data, and sonar data. The cursor assist mode can facilitate interaction with a graphical user interface containing chart data, radar data, and sonar data. FIGS. 5 and 6 describe the use of the cursor assist mode to facilitate interaction with a graphical user interface that includes chart data. FIGS. 7 and 8 describe the use of the cursor assist mode to facilitate interaction with a graphical user interface that includes radar data.

Chart Data

FIG. 5 illustrates a graphical user interface 500 containing chart data. The screen 105 of the display device 100 may display the graphical user interface 500. The chart data may include a local map of the region surrounding the display device 100. The map may include numerous points of interest 505, such as, tidal stations 505(1), buoys 505(2), geographical features 505(3), and the like.

The graphical user interface 500 can also selectively provide a menu 515. The menu 515 may be displayed in response to a user request for the menu 515. For example, the user can request a menu 515 by touching a predetermined area on the graphical user interface 500. The user can request that the display device 100 select certain points of interest and provide more information about them. In one implementation, the user can make the request by placing the offset cursor 215 at the point of interest 505 and pressing one of the plurality of buttons, e.g., FIG. 1, 120. In response to receiving the user selection of the point of interest 505, the display device 100 may provide information about the selected point of interest 505. For example, the display device 100 may provide information about the conditions at the point of interest, such as latitude, longitude, air temperature, wind direction, and, if on water, water surface temperature and depth. If the point of interest is a tidal station 505(1), the display device 100 may provide information about the tides that have been recorded at the tidal station 505(1). If the point of interest 505(2) is a buoy, the display device 100 may display the identification number of the buoy.

Additionally, the user can select geographical points 510 on the map that are not associated with any particular point of interest 505. In response to receiving a user selection of a geographical point 510, the display device 100 may display the latitude, longitude, estimated air temperature, and if on water, water surface temperature and depth. In some implementations, some of these information may not be shown.

After selecting the particular point of interest 505 or the particular geographic point 510, the user can request that the display device 100 place a marker 520 on the particular point of interest 505 (not shown) or the particular geographic point 510 (shown). The markers 520 can be used for a variety of purposes, such as setting waypoints, recording points, and determining the distance between two points. In one implementation, the markers 520 may be waypoints. Waypoints may be commonly known as standalone points of interest.

The markers 520 can also be used to store points of interest 505 or geographical points 510 to memory, e.g., FIG. 5, memory 540. After marking a point of interest 505 or geographical point 510, the user can request that the display device 100 records the point of interest 505 or geographical point 510. Upon receiving the user request, the display device 100 records the point of interest 505 or geographical point 510 (recorded point) to a storage device (not shown). As stated above, the chart data may include a local map of the region surrounding the display device 100 or the vessel carrying the display device 100. As the vessel carrying the display device 100 moves, the local map of the region surrounding the display device 100 changes. If the vessel carrying the display device 100 moves far enough the entire chart data will be different. The recorded point will no longer appear on the screen 105. If the vessel carrying the display device 100 returns to the vicinity of the recorded point, the recorded point may reappear on the screen 105. However, the recorded point will appear with the marker.

In one implementation, the user can determine the distance between two geographical locations 510(1) and 510(2) by requesting the display device 100 place a marker 520 over the source point 510(1) and dragging the offset cursor 215 from the source point 510(1) to the destination 510(2). At the destination 510(2), the user can request that the display device 100 place the second marker 520. In another implementation, the display device 100 automatically calculates the distance between the source point 510(1) and another geographic point 510 under the offset cursor 215 in real time.

FIG. 6 illustrates a flow diagram describing a process for determining the distance between two points. This process will be described with reference to FIG. 5 and assumes that the offset cursor 215 is displayed on the screen. At block 610, the display device 100 receives a request for determination of the distance between two points, e.g., 510(1) and 510(2). At block 615, the display device 100 receives a request for placement of a marker 520 over the source point 510(1). At block 620, the display device 100 places a marker 520 over the source point 510(1). The user can then drag the offset cursor 130 from the source point 510(1) towards the destination 510(2). The user can identify the destination point 510(2) by making a user request to the display device 100 to place another marker at the destination point 510(2) at block 625. At block 630, the display device 100 places a marker at the destination point, and at block 635, the display device 100 determines and displays the distance between source point 510(1) and the destination 510(2)

Radar Data

FIG. 7 illustrates a graphical user interface 700 containing radar data. The radar data includes a graphic of a compass 705 and indicates a heading line 710 for a vessel carrying the display device 100. The position of the heading line 710 with respect to the compass 705 indicates the direction that the vessel carrying the display device 100 is traveling. The graphical user interface 700 also includes rings 715 that indicate a set of points that are at predetermined distances from the vessel. By default, the center position of the graphical user interface 700 shows the current position 717 of the vessel carrying the display device 100. The bottom left 718 of the graphical user interface 700 indicates the latitude and longitude coordinates of the offset cursor 215.

The graphical user interface 700 can also selectively provide a menu 720. The graphical user interface 700 can provide the menu 720 in response to a user request for the menu 720. For example, the user can request a menu 720 by touching a predetermined area 725 on the graphical user interface 700.

An electronic bearing line (EBL) 725 can be established with the use of the offset cursor 215. The EBL 725 can be used to find the distance and bearing of a target 728 at a point on the radar display. The target 728 can be a stationary or moving object, such as another vessel. The EBL 725 may be set by dragging the offset cursor 215 to the object or point on the radar display. Alternatively, the EBL 725 may be set by positioning the offset cursor 215 on the target 728. When the offset cursor 215 is above the object or point, the user can request that the display device 100 establish the EBL 725 by making a selection on the menu 720. The EBL 725 can automatically connect the current position 717 of the vessel to the target 728. The EBL 725 may follow the movement of the vessel carrying the display device 100 and the movement of the target 728.

FIG. 8 illustrates a flow diagram for setting the EBL 725. At block 810, the display device 100 displays radar data. At block 815, the display device 100 receives a user request for an offset cursor 215. At block 820, the display device 100 provides the offset cursor 215. At 822, the display device 100 receives a user request to select a target 728 by detecting movement of the user's finger on the screen 105. At block 825, the display device 100 moves the offset cursor 215 at a predetermined distance from the user's finger to the target 728. At block 830, the display device 100 receives a user request to set an EBL 725. At block 835, the display device 100 sets an EBL connecting the current position 717 of the vessel carrying the display device 100 to the target 728. At 840, the display device 100 moves the EBL 725 in accordance with the movement of the vessel carrying the display device 100 and the movement of the target 728, if any.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 9:
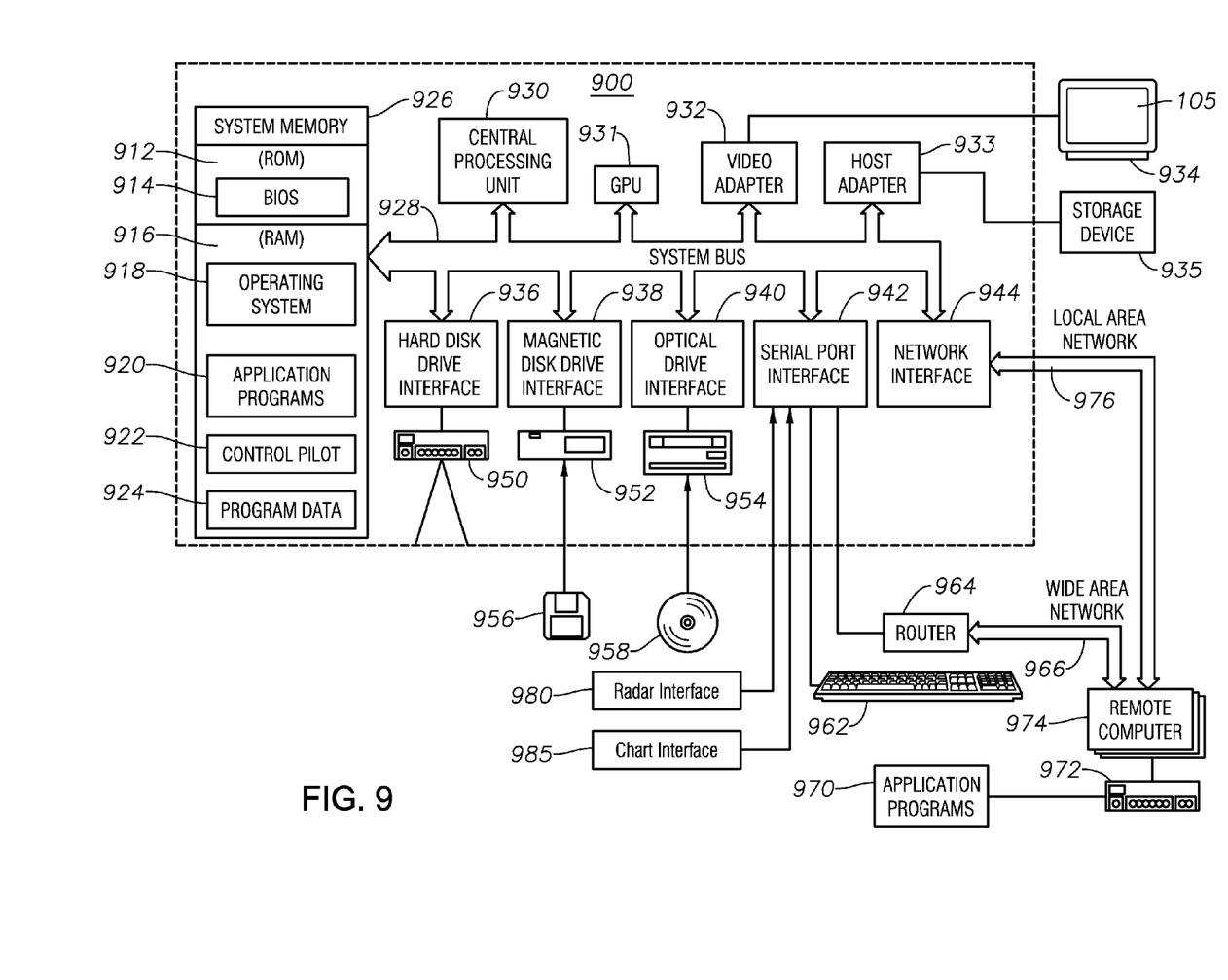
FIG. 9 illustrates a schematic of a computing system into which implementations of various techniques presented herein may be implemented.

FIG. 9 illustrates a schematic diagram of a computing system 900 in which the various technologies described herein may be incorporated and practiced. Although the computing system 900 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 900 may include a central processing unit (CPU) 930, a system memory 926, a graphics processing unit (GPU) 931 and a system bus 928 that couples various system components including the system memory 926 to the CPU 930. Although only one CPU is illustrated in FIG. 9, it should be understood that in some implementations the computing system 900 may include more than one CPU.

The CPU 930 can include a microprocessor, a microcontroller, a processor, a programmable integrated circuit, or a combination thereof. The CPU 930 can comprise an off-the-shelf processor such as a Reduced Instruction Set Computer (RISC™), or a Microprocessor without Interlocked Pipeline Stages (MIPS™) processor, or a combination thereof. The CPU 930 can also comprise a proprietary processor.

The GPU 931 may be a microprocessor specifically designed to manipulate and implement computer graphics. The CPU 930 may offload work to the GPU 931. The GPU 931 may have its own graphics memory, and/or may have access to a portion of the system memory 926. As with the CPU 930, the GPU 931 may include one or more processing units, and each processing unit may include one or more cores.

The CPU 930 can provide output data to a graphics processor 931. The graphics processor 931 can generate graphical user interfaces that present the output data. The graphics processor 931 can also provide objects, such as menus, in the graphical user interface. A user can provide inputs by interacting with the objects. The graphics processor 1531 can receive the inputs from interaction with the objects and provide the inputs to the CPU 930.

The system bus 928 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 926 may include a read only memory (ROM) 912 and a random access memory (RAM) 916. A basic input/output system (BIOS) 914, containing the basic routines that help transfer information between elements within the computing system 900, such as during start-up, may be stored in the ROM 912.

The computing system 900 may further include a hard disk drive interface 936 for reading from and writing to a hard disk 950, a magnetic disk drive 952 for reading from and writing to a removable magnetic disk 956, and an optical disk drive 954 for reading from and writing to a removable optical disk 958, such as a CD ROM or other optical media. The hard disk 950, the magnetic disk drive 952, and the optical disk drive 954 may be connected to the system bus 928 by a hard disk drive interface 936, a magnetic disk drive interface 938, and an optical drive interface 940, respectively. The drives and their associated computer-readable media may provide nonvolatile storage of computer-readable instructions, data structures, program modules and other data for the computing system 900.

Although the computing system 900 is described herein as having a hard disk, a removable magnetic disk 956 and a removable optical disk 958, it should be appreciated by those skilled in the art that the computing system 900 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 900. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 900 may also include a host adapter 933 that connects to a storage device 935 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 950, magnetic disk 956, optical disk 958, ROM 912 or RAM 916, including an operating system 918, one or more application programs 920, control pilot 922, and program data 924. In certain implementations, the hard disk 950 may include and a database system. The database system could record, for example, recorded points. The application programs 920 may include various mobile applications ("apps") and other applications configured to perform various methods and techniques described herein. The operating system 918 may be any suitable operating system that may control the operation of a networked personal or server computer.

A user may enter commands and information into the computing system 900 through input devices such as buttons 962. Other input devices may include a microphone (not shown). These and other input devices may be connected to the CPU 930 through a serial port interface 942 coupled to system bus 928, but may be connected by other interfaces, such as a parallel port, game port or a universal serial bus (USB).

Additionally, the user can enter inputs through a monitor 934. As noted above, in certain implementations, the screen 105 can be sensitive to touching by a finger 110, while in other implementations, the screen 105 can be sensitive to the body heat from the finger 110. The screen 105 detects placement and movement of the user's fingers and provides signals that are indicative of such placement and movement to the CPU 930. Additionally, the screen 105 detects user interactions with the objects provided by the GPU 931 and provides signals that are indicative of the user interactions with the objects. The monitor 934 may also be connected to system bus 928 via an interface, such as a video adapter 932.

In certain implementations, the computing system 900 also has a radar interface 980 and a chart interface 985 connected to the system bus 928. The radar interface 980 can be operably connected to a radar system (not shown). The radar interface 980 can receive signals from the radar system, and convert the signals to a data format that is compatible with the CPU 930. The chart interface 985 can be operably connected to a Global Positioning Satellite (GPS) navigation system (not shown), or a combination thereof. The chart interface 985 can receive signals from the GPS system, and convert the signals to a data format that is compatible with the CPU 930.

Further, the computing system 900 may operate in a networked environment using logical connections to one or more remote computers 974. The logical connections may be any connection that is commonplace in offices, enterprise-wide computer networks, intranets, and the Internet, such as local area network (LAN) 976 and a wide area network (WAN) 966. The remote computers 974 may be another computer, a server computer, a router, a network PC, a peer device or other common network node, and may include many or all of the elements describes above relative to the computing system 900. The remote computers 974 may also each include application programs 970 similar to that of the computer action function.

When using a LAN networking environment, the computing system 900 may be connected to the local network 976 through a network interface or adapter 944. When used in a WAN networking environment, the computing system 900 may include a wireless router 964 or other means for establishing communication over a wide area network 966, such as the Internet. The router 964 may be connected to the system bus 928 via the serial port interface 942. In a networked environment, program modules depicted relative to the computing system 900, or portions thereof, may be stored in a remote memory storage device 972. It will be appreciated that the network connections shown are exemplary and other means of establishing a communications link between the computers may be used.

In other implementations, the computing system 900 can receive signals from a GPS navigation system and radar system through the network interface 944.

The network interface 944 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 974.

In certain implementations, at least certain parts or the entire computing system 900, the monitor 934, buttons 962, and microphone (not shown), can be integrated into a display device 100.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enabling user control of marine electronic information, the method comprising:
    displaying marine electronic data in the form of a chart on a touchscreen;
    providing a cursor, wherein the cursor is movable by placement of a user's finger over the cursor;
    causing the marine electronic data to be panned such that the chart scrolls across the touchscreen;
    receiving user input in the form of placement of the user's finger on the touchscreen at a first position on the chart as it is being panned; and
    in response to receiving the user input:
        causing freezing of the panning of the marine electronic data, and
        displaying the cursor at a second position on the chart, wherein the second position is at a predetermined offset from the first position such that the cursor is not obstructed from view by the user's finger.

2. The method of claim 1, wherein receiving the user input comprises detecting stationary placement of the user's finger on the touchscreen cursor for at least a predetermined amount of time.

3. The method of claim 1 further comprising:
    detecting movement of the user's finger across the touchscreen; and
    causing the cursor to move with the user's finger while being offset from the position of the user's finger such that the cursor is not obstructed from view by the user's finger.

4. The method of claim 3 further comprising:
    receiving user input indicating a selection of a location on the chart corresponding to the offset position of the cursor; and causing information associated with the selected location to be displayed.

5. A non-transitory computer-readable medium having stored thereon computer-executable instructions which, when executed by a computer, cause the computer to:
   display marine electronic data in the form of a chart on a touchscreen;
   provide a cursor, wherein the cursor is movable by placement of a user's finger over the cursor;
   cause the marine electronic data to be panned such that the chart scrolls across the touchscreen;
   receive user input in the form of placement of the user's finger on the touchscreen at a first position on the chart as it is being panned; and
   in response to receiving the user input:
      cause freezing of the panning of the marine electronic data; and
      display the cursor at the second position on the chart, wherein the second position is at a predetermined offset from the first position such that the cursor is no obstructed from view by the user's finger.

6. The non-transitory computer-readable medium of claim 5, wherein the cursor at the second position moves with the movement of the user's finger.

7. The non-transitory computer-readable medium of claim 5 wherein the predetermined offset is between about ¼" to about ½".

8. The non-transitory computer-readable medium of claim 5, wherein the executable instructions which cause the computer to receive the user input comprises executable instructions which cause the computer to detect stationary placement of the user's finger on the touchscreen at the first position for at least a predetermined time.

9. The non-transitory computer-readable medium of claim 5, wherein the executable instructions further cause the computer to:
   move the cursor corresponding with a movement of the user's finger;
   receive a first user selection of a first point under the cursor at a third position;
   mark the first point under the cursor at the third position;
   receive a second user selection of a second point under the cursor at a fourth position; and
   determine the distance between the first point and the second point.

10. The non-transitory computer-readable medium of claim 5, wherein the executable instructions further cause the computer to:
   receive a user request to create an electronic bearing line from a current location, wherein the user request is made at the current location;
   move the cursor corresponding to a movement of the user's finger to a point; and
   create the electronic bearing line connecting the current location to the point.

11. The non-transitory computer-readable medium of claim 5, wherein the executable instructions further cause the computer to:
   detect movement of the user's finger across the touchscreen; and
   cause the cursor to move with the user's finger while being offset from the position of the user's finger such that the cursor is not obstructed from view by the user's finger.

12. The non-transitory computer-readable medium of claim 11, wherein the executable instructions further cause the computer to:
   receive user input indicating a selection of a location on the chart corresponding to the offset position of the cursor; and
   cause information associated with the selected location to be displayed.

13. An apparatus for displaying marine electronic data, said apparatus comprising:
   one or more processors;
   a screen;
   memory having a plurality of executable instructions which, when executed by the one or more processors, cause the one or more processor to:
      display marine electronic data in the form of a chart on a touchscreen;
      provide a cursor, wherein the cursor is movable by placement of a user's finger over the cursor;
      cause the marine electronic data to be panned such that the chart scrolls across the touchscreen;
      receive user input in the form of placement of the user's finger on the touchscreen at a first position on the chart as it is being panned; and
      in response to receiving the user input:
         cause freezing of the panning of the marine electronic data; and
         display the cursor at the second position on the chart, wherein the second position is at a predetermined offset from the first position such that the cursor is no obstructed from view by the user's finger.

14. The apparatus of claim 13, wherein the cursor at the second position moves with the movement of the user's finger.

15. The apparatus of claim 14, wherein the predetermined offset is between about ¼" to about ½".

16. The apparatus of claim 14, wherein the plurality of executable instructions causes the one or more processors to:
   move the cursor corresponding to a movement of the user's finger;
   mark a point underneath the cursor at a third position;
   store the point in the memory at a first time; and
   retrieve the point with the marker from the memory at a second time.

17. The apparatus of claim 13, wherein the plurality of executable instructions further causes the one or more processors to:
   move the cursor corresponding with a movement of the user's finger;
   receive a first user selection of a first point under the cursor at a third position;
   mark the first point under the cursor at the third position;
   receive a second user selection of a second point under the cursor at a fourth position; and
   determine the distance between the first point and the second point.

18. The apparatus of claim 13, wherein the plurality of executable instructions further causes the one or more processors to:
   receive a user request to create an electronic bearing line from a current location, wherein the user request is made at the current location;
   move the cursor corresponding to a movement of the user's finger to a point; and
   create the electronic bearing line connecting the current location to the point.

19. The apparatus of claim 13, wherein the plurality of executable instructions further causes the one or more processors to:

detect movement of the user's finger across the touchscreen; and cause the cursor to move with the user's finger while being offset from the position of the user's finger such that the cursor is not obstructed from view by the user's finger.

20. The apparatus of claim 19, wherein the plurality of executable instructions further causes the one or more processors to:

receive user input indicating a selection of a location on the chart corresponding to the offset position of the cursor; and cause information associated with the selected location to be displayed.

* * * * *

UNITED STATES PATENT AND TRADEMARK OFFICE
CERTIFICATE OF CORRECTION

| | | |
|---|---|---|
| PATENT NO. | : 9,495,065 B2 | Page 1 of 1 |
| APPLICATION NO. | : 13/731139 | |
| DATED | : November 15, 2016 | |
| INVENTOR(S) | : Steve Thomas and Paul Butterworth | |

It is certified that error appears in the above-identified patent and that said Letters Patent is hereby corrected as shown below:

In the Claims
Claim 2, Column 12, Line 55 "on the touchscreen cursor for at least a predetermined" should read
--on the touchscreen for at least a predetermined--

Signed and Sealed this
Fourteenth Day of March, 2017

Michelle K. Lee
*Director of the United States Patent and Trademark Office*